US009141818B2

(12) United States Patent
Oneda et al.

(10) Patent No.: US 9,141,818 B2
(45) Date of Patent: Sep. 22, 2015

(54) INFORMATION PROVIDING APPARATUS AND NON-TRANSITORY COMPUTER READABLE MEDIUM HAVING STORED INFORMATION FOR EACH MARKER IMAGE IDENTIFICATION INFORMATION

(71) Applicant: FUJI XEROX CO., LTD., Tokyo (JP)

(72) Inventors: Yuichi Oneda, Kanagawa (JP);
Kenichiro Fukuda, Kanagawa (JP);
Shinpei Noda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 46 days.

(21) Appl. No.: 13/969,805

(22) Filed: Aug. 19, 2013

(65) Prior Publication Data

US 2014/0208392 A1    Jul. 24, 2014

(30) Foreign Application Priority Data

Jan. 23, 2013    (JP) .................................. 2013-010386

(51) Int. Cl.
| G06F 21/00 | (2013.01) |
| G06F 21/62 | (2013.01) |
| H04N 1/32 | (2006.01) |
| H04L 29/06 | (2006.01) |

(52) U.S. Cl.
CPC ............ *G06F 21/62* (2013.01); *H04N 1/32117* (2013.01); *H04L 63/10* (2013.01); *H04N 2201/3246* (2013.01); *H04N 2201/3276* (2013.01)

(58) Field of Classification Search
None
See application file for complete search history.

(56) References Cited

U.S. PATENT DOCUMENTS

| 2008/0129758 A1* | 6/2008 | Fox et al. ....................... 345/661 |
| 2011/0019877 A1* | 1/2011 | Kasemann et al. ............ 382/107 |
| 2011/0154174 A1* | 6/2011 | Liu et al. ........................ 715/205 |
| 2012/0110036 A1* | 5/2012 | Rabii ............................. 707/822 |
| 2013/0212618 A1* | 8/2013 | Schultz ........................... 725/30 |

FOREIGN PATENT DOCUMENTS

| JP | A-6-266601 | 9/1994 |
| JP | A-10-136340 | 5/1998 |
| JP | A-2005-149323 | 6/2005 |

* cited by examiner

*Primary Examiner* — Harunur Rashid
*Assistant Examiner* — Andrew Steinle
(74) *Attorney, Agent, or Firm* — Oliff PLC (57) ABSTRACT

An information providing apparatus includes following components. A storing unit stores marker image identification information, an image feature of a marker placed area, related information, and disclosure limitation information indicating whether the related information is to be disclosed to specific users in an image information memory. A user information memory stores user identification information identifying a user and privilege information indicating a privilege of the user. An obtaining unit obtains, from an information terminal, user identification information and a target image. A search unit searches the image information memory for marker image identification information of a marker image having an image feature similar to that included in the target image. A providing unit provides, if the corresponding disclosure limitation information indicates limited disclosure and the corresponding privilege information indicates that access to the retrieved related information is permitted, the corresponding related information to the information terminal.

5 Claims, 9 Drawing Sheets

| USER ID | PASSWORD | GROUP ID | USER'S ROLE |
|---|---|---|---|
| U0001 | abc ··· | G0001 | EDITOR |
| U0002 | def ··· | G0001 | GENERAL |
| U0003 | ghi ··· | G0002 | EDITOR |
|  |  |  |  |

FIG. 4

| MARKER ID | LINK | STATUS | FEATURE POINT INFORMATION | NUMBER OF TIMES RETRIEVED | REGISTRANT |
|---|---|---|---|---|---|
| M0001 | http://aaa/a ··· | DISCLOSURE | 1010 ··· | 10 | U0001 |
| M0002 | http://aaa/b ··· | TRIAL DISCLOSURE | 0101 ··· | 1 | U0003 |
| M0003 | http://aaa/c ··· | TRIAL DISCLOSURE | 1100 ··· | 0 | U0005 |
|  |  |  |  |  |  |

INFORMATION PROVIDING APPARATUS AND NON-TRANSITORY COMPUTER READABLE MEDIUM HAVING STORED INFORMATION FOR EACH MARKER IMAGE IDENTIFICATION INFORMATION

CROSS-REFERENCE TO RELATED APPLICATIONS

This application is based on and claims priority under 35 USC 119 from Japanese Patent Application No. 2013-010386 filed Jan. 23, 2013.

BACKGROUND

Technical Field

The present invention relates to an information providing apparatus, an information providing method, and a non-transitory computer readable medium.

SUMMARY

According to an aspect of the invention, there is provided an information providing apparatus including a storing unit, a user information memory, an obtaining unit, a search unit, and a providing unit. The storing unit stores, for each piece of marker image identification information identifying a corresponding marker image placed on a corresponding image, an image feature included in an area where the corresponding marker image is placed, related information associated with the piece of marker image identification information, and disclosure limitation information indicating whether the related information is to be disclosed to all users or specific users, in an image information memory in association with one another. The user information memory stores user identification information identifying a corresponding user and privilege information indicating a privilege assigned to the user, in association with each other. The obtaining unit obtains, from an information terminal, user identification information and a target image. The search unit searches the image information memory for one or more pieces of marker image identification information of one or more marker images having an image feature similar to an image feature included in the target image. The providing unit provides, in a case where the disclosure limitation information associated with a piece of marker image identification information among the one or more retrieved pieces of marker image identification information indicates that the corresponding related information is to be disclosed to specific users and the privilege information associated with the obtained user identification information indicates that access to the related information that is to be disclosed to specific users is permitted, the corresponding related information to the information terminal.

BRIEF DESCRIPTION OF THE DRAWINGS

An exemplary embodiment of the present invention will be described in detail based on the following figures, wherein.

DETAILED DESCRIPTION

An exemplary embodiment for carrying out the present invention will be described below with reference to the drawings.

1. System Configuration

Figure 1:
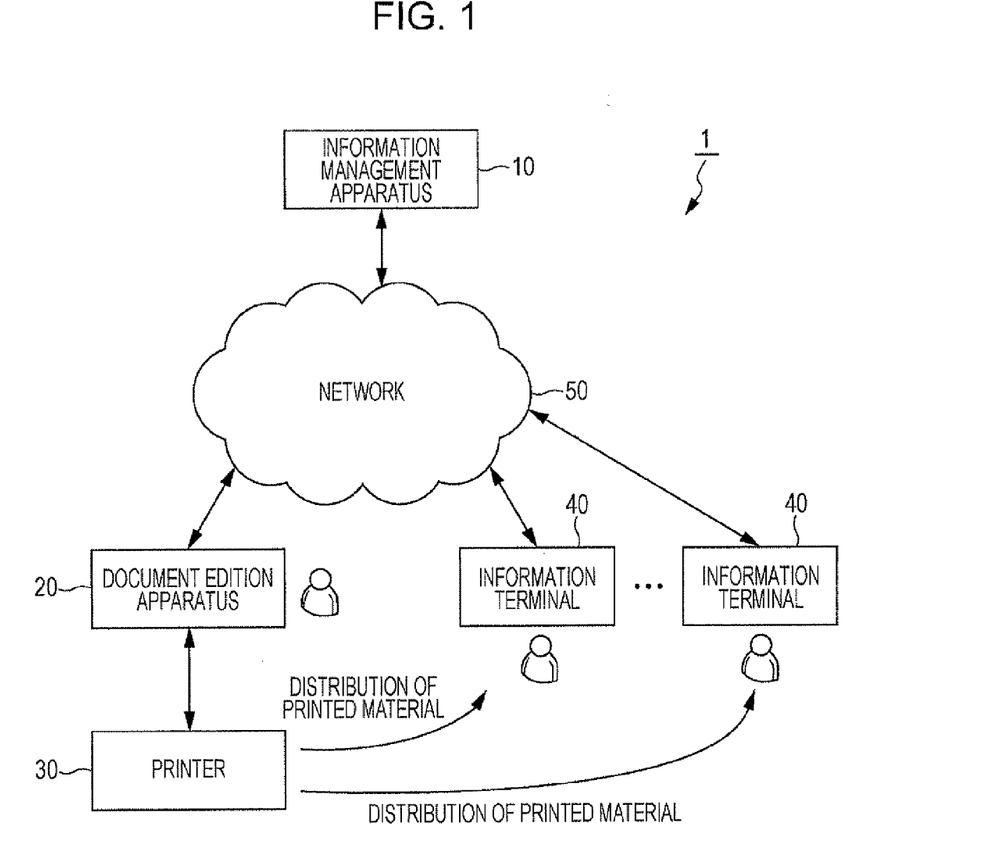
FIG. 1 illustrates the system configuration of an information processing system according to an exemplary embodiment.

FIG. 1 illustrates the system configuration of an information processing system 1 according to an exemplary embodiment. As illustrated in FIG. 1, the information processing system 1 includes an information management apparatus 10, a document edition apparatus 20, and one or more information terminals 40. The information management apparatus 10, the document edition apparatus 20, and the information terminals 40 are able to perform data communication with each other via a network 50. Also, the document edition apparatus 20 is connected to a printer 30. The following describes the overview of processes performed in the information processing system 1.

The document edition apparatus 20 places a marker (marker image) in a portion of a document to be edited (a document to be registered). The document edition apparatus 20 also sets marker information (for example, a link such as uniform resource locator (URL)) to be associated with the placed marker. The document edition apparatus 20 transmits a document to be registered and marker information (containing, for example, a marker placed area and marker link information) to the information management apparatus 10. The information management apparatus 10 associates a marker ID that identifies the marker information received from the document edition apparatus 20, image features of a marker placed area, and a link of the marker with each other, and sets the initial status associated with the marker ID to trial disclosure. Here, the term "trial disclosure" indicates a state in which a disclosure target is limited so that information associated with the marker ID is to be disclosed only to users having a predetermined privilege. The document edition apparatus 20 causes the printer 30 to print the document in which a marker is placed. The resulting printed material is distributed to the user.

The user who has received the distributed printed document captures an image of an image area of the printed material containing a marker by using the information terminal 40 equipped with a camera, for example. The information terminal 40 then transmits the captured image and the user ID to the information management apparatus 10. The information management apparatus 10 extracts a marker placed area from the captured image received from the information terminal 40, and searches for corresponding marker IDs on the basis of image features of the extracted marker placed area. At this time, in the case where the retrieved marker IDs include a marker ID associated with a trial disclosure status, the information management apparatus 10 determines whether or not disclosure to the user identified by the user ID transmitted from the information terminal 40 along with the captured image is permitted. If the disclosure is not permitted, the information management apparatus 10 removes the marker ID associated with the trial disclosure status from the search result. Then, the information management apparatus 10 transmits link information associated with the retrieved marker IDs to the information terminal 40.

The information terminal 40 obtains information on the basis of a link selected from the link information received from the information management apparatus 10, and displays the obtained information. Note that in the case where the status associated with the marker ID is changed from trial disclosure to disclosure, the marker ID is no longer removed from the search result. The status associated with the marker ID may be changed in response to a request from the user or when the search history of the marker ID satisfies a predetermined condition.

2. Hardware Configurations

Now, configurations of the information management apparatus 10, the document edition apparatus 20, and the information terminal 40 for implementing the above-described processes will be described.

2-1. Information Management Apparatus 10

Figure 2:
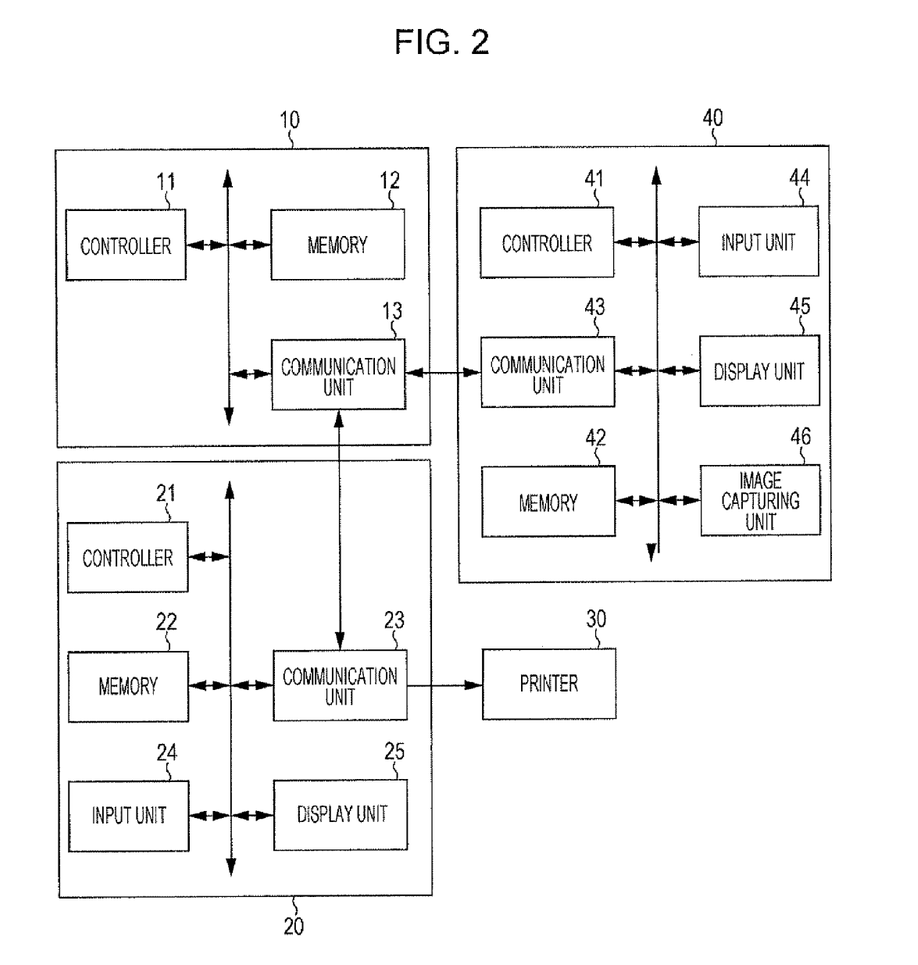
FIG. 2 illustrates an example of hardware configurations of an information management apparatus, a document edition apparatus, and an information terminal.

First, an example of the hardware configuration of the information management apparatus 10 will be described. As illustrated in FIG. 2, the information management apparatus 10 includes a controller 11, a memory 12, and a communication unit 13.

The controller 11 includes a central processing unit (CPU). The controller 11 performs various kinds of arithmetic processing in accordance with programs stored in the memory 12, and controls each component of the information management apparatus 10.

The memory 12 stores data and programs of the operating system of the information management apparatus 10 or the like. The memory 12 is also used as a work memory of the controller 11. The programs may be supplied to the information management apparatus 10 with stored on an information storage medium, such as an optical disc, a magnetic disk, a magnetic tape, a magneto-optical disk, or a flash memory; or may be supplied to the information management apparatus 10 via a data communication network, such as the Internet. The following describes examples of data stored in the memory 12.

Figure 3:
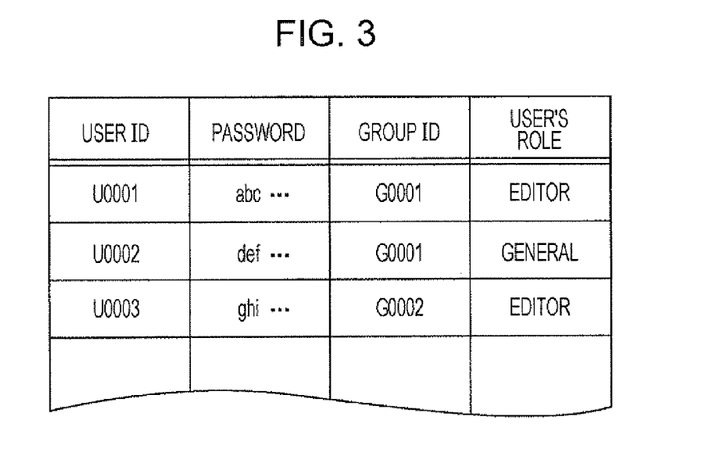
FIG. 3 illustrates an example of a user information management table.

The memory 12 stores, for example, a user information management table that manages information regarding users. FIG. 3 illustrates an example of the user information management table. As illustrated in FIG. 3, the user information management table stores a user ID, a password, a group ID, and a user's role in association with each other. The user ID identifies a user. The group ID identifies a group (such as an organization or department) to which the user belongs. The user's role indicates whether or not a privilege of the editor is assigned to the user (for example, whether the user is an editor having the privilege of the editor or a general user not having the privilege of the editor).

Figure 4:
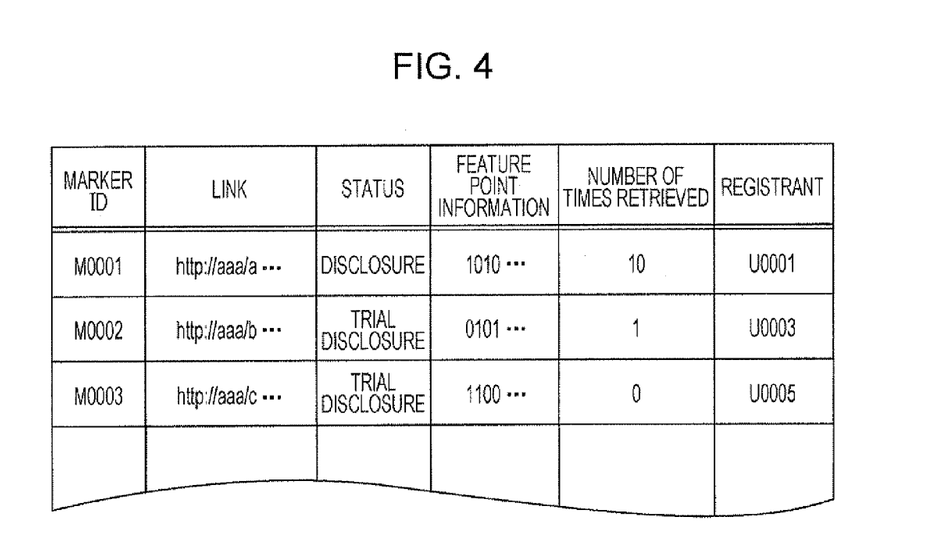
FIG. 4 illustrates an example of a marker information management table.

The memory 12 also stores, for example, a marker information management table that manages information regarding markers. FIG. 4 illustrates an example of the marker information management table. As illustrated in FIG. 4, the marker information management table stores a marker ID identifying a marker, a link (URL) associated with the marker, the status associated with the marker ID, feature point information, the number of times the marker ID has been retrieved (or the number of times information has been provided), and information on a registrant of the marker ID in association with each other. The status associated with the marker ID indicates a disclosure status in which disclosure to general users is permitted or a trial disclosure status in which disclosure only to editors is permitted but disclosure to general users is not permitted. The feature point information is based on image features of a marker placed area.

The communication unit 13 is implemented by, for example, a network interface card. Via the network interface card, the communication unit 13 performs data communication with the document edition apparatus 20 and the information terminals 40 connected thereto via the network 50.

2-2. Document Edition Apparatus 20

Next, an example of the hardware configuration of the document edition apparatus 20 will be described. As illustrated in FIG. 2, the document edition apparatus 20 includes a controller 21, a memory 22, a communication unit 23, an input unit 24, and a display unit 25.

The controller 21 includes a CPU. The controller 21 performs various kinds of arithmetic processing in accordance with programs stored in the memory 22, and controls each component of the document edition apparatus 20.

The memory 22 stores data (for example, document data) and programs of the operating system of the document edition apparatus 20 or the like. The memory 22 is also used as a work memory of the controller 21. The programs may be supplied to the document edition apparatus 20 with stored on an information storage medium, such as an optical disc, a magnetic disk, a magnetic tape, a magneto-optical disk, or a flash memory; or may be supplied to the document edition apparatus 20 via a data communication network, such as the Internet.

The communication unit 23 includes, for example, a network interface card. Via the network interface card, the communication unit 23 performs data communication with the information management apparatus 10 and the information terminals 40 connected thereto via the network 50. The communication unit 23 also performs data communication with the printer 30 connected thereto via a local area network, a serial cable, or the like.

The input unit 24 is implemented by input devices, for example, a touch screen, a keyboard, and a mouse, and receives an input operation performed by the user.

The display unit 25 is implemented by a display device, such as a liquid crystal display, and displays a result (screen) of information processing performed by the controller 21.

2-3. Information Terminal 40

Next, an example of the hardware configuration of the information terminal 40 will be described. As illustrated in FIG. 2, the information terminal 40 includes a controller 41, a memory 42, a communication unit 43, an input unit 44, a display unit 45, and an image capturing unit 46.

The controller 41 includes a CPU. The controller 41 performs various kinds of arithmetic processing in accordance with programs stored in the memory 42, and controls each component of the information terminal 40.

The memory 42 stores data (for example, document data) and programs of the operating system of the information terminal 40 or the like. The memory 42 is also used as a work memory of the controller 41. The programs may be supplied to the information terminal 40 with stored on an information storage medium, such as an optical disc, a magnetic disk, a magnetic tape, a magneto-optical disk, or a flash memory; or may be supplied to the information terminal 40 via a data communication network, such as the Internet.

The communication unit 43 includes, for example, a network interface card. Via the network interface card, the communication unit 43 performs data communication with the information management apparatus 10 and the document edition apparatus 20 connected thereto via the network 50.

The input unit 44 is implemented by input devices, for example, a touch screen, a keyboard, and a mouse, and receives an input operation performed by the user.

The display unit 45 is implemented by a display device, such as a liquid crystal display, and displays a result (screen) of information processing performed by the controller 41.

The image capturing unit 46 is implemented by, for example, a camera built in or externally connected to the information terminal 40, and obtains a captured image by capturing an image of a subject with the camera.

3. Sequences

Now, details of processes performed by the information management apparatus 10, the document edition apparatus 20, and the information terminal 40 included in the information processing system 1 will be described with reference to sequence diagrams and a flowchart illustrated in FIGS. 5 to 10.

3-1. Marker Information Registration Process

Figure 5:
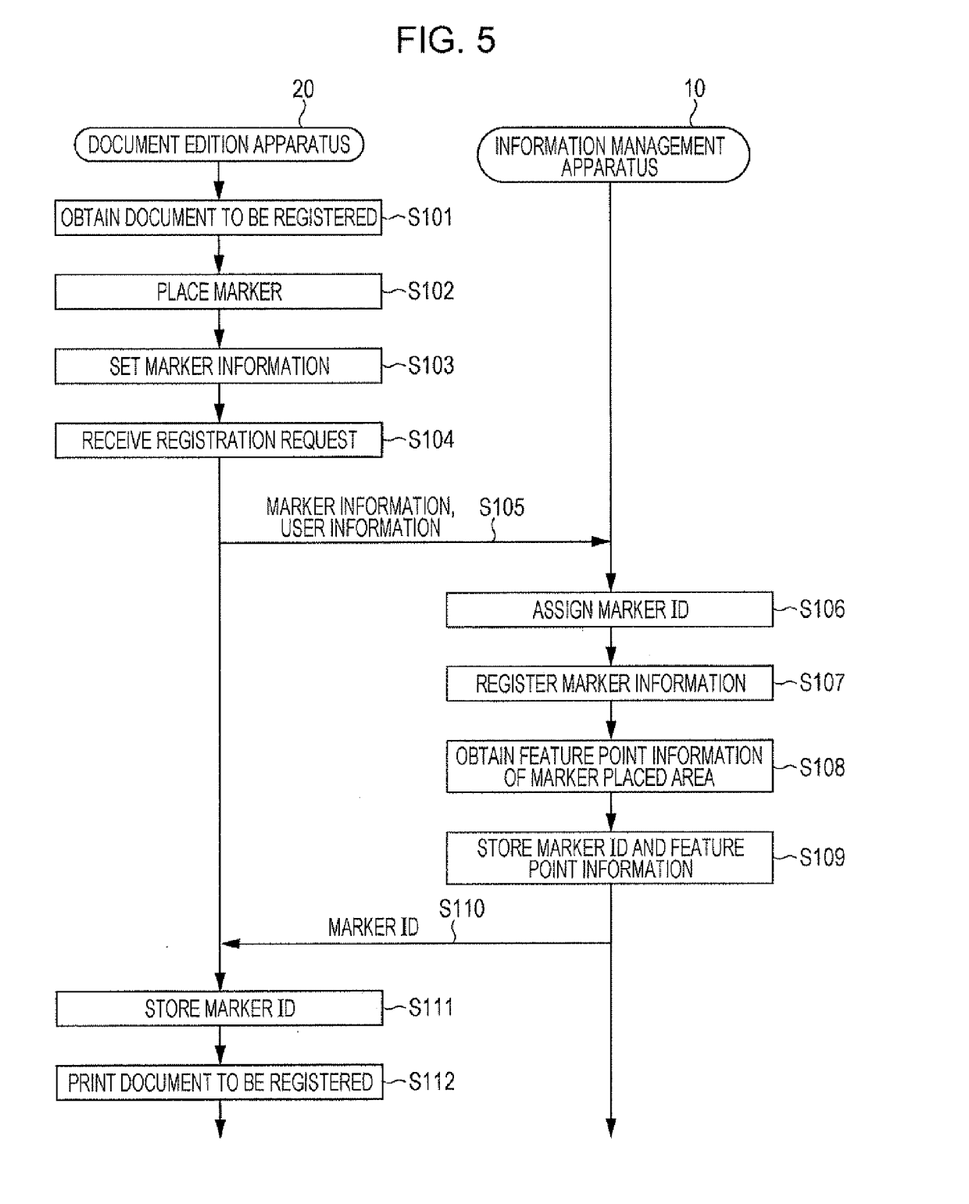
FIG. 5 is a sequence diagram illustrating an example of a marker information registration process.

FIG. 5 is a sequence diagram of a marker information registration process that is performed when the document edition apparatus 20 registers marker information in the information management apparatus 10.

As illustrated in FIG. 5, the document edition apparatus 20 obtains a to-be-registered document on the basis of operation information received from a user (editor), for example (S101). The document edition apparatus 20 then places a marker (marker image) in the to-be-registered document in accordance with operation information received from the user (editor) (S102). The document edition apparatus 20 also sets marker information which contains a link associated with the placed marker and a color of the marker (S103). Thereafter, upon receipt of a marker registration request from the user (editor) (S104), the document edition apparatus 20 transmits the set marker information (containing an image of the marker placed area and information on the link and the color) and user information (user ID) to the information management apparatus 10 (S105).

The information management apparatus 10 assigns a marker ID to the marker information received from the document edition apparatus 20 (S106), and registers the marker information in association with the assigned marker ID (S107). For example, the information management apparatus 10 may register the marker information by storing the link contained in the marker information received in S105 as the link associated with the marker ID, trial disclosure as the initial status value, zero as the number of times retrieved, and the user ID received in S105 as the registrant in the marker information management table illustrated in FIG. 4.

Further, the information management apparatus 10 extracts image features of the image of the marker placed area, and obtains feature point information that is based on the extracted image features (S108). The information management apparatus 10 registers the obtained feature point information in association with the marker ID (S109). For example, the information management apparatus 10 may register the feature point information by storing the feature point information obtained in S108 as the feature point information associated with the marker ID in the marker information management table illustrated in FIG. 4.

After finishing registration of the marker information, the information management apparatus 10 transmits the marker ID assigned during registration to the document edition apparatus 20 (S110).

The document edition apparatus 20 stores the marker ID received from the information management apparatus 10 (S111). The document edition apparatus 20 then causes the printer 30 to print the to-be-registered document for which the marker information has been registered (S112). The resulting printed material output from the printer 30 may be distributed to editors on a trial basis or to general users.

3-2. Information Providing Process

Referring next to a sequence diagram illustrated in FIG. 6, details of an information providing process that is performed when the information terminal 40 requests the information management apparatus 10 to provide information based on a marker formed on a printed material will be described.

Figure 6:
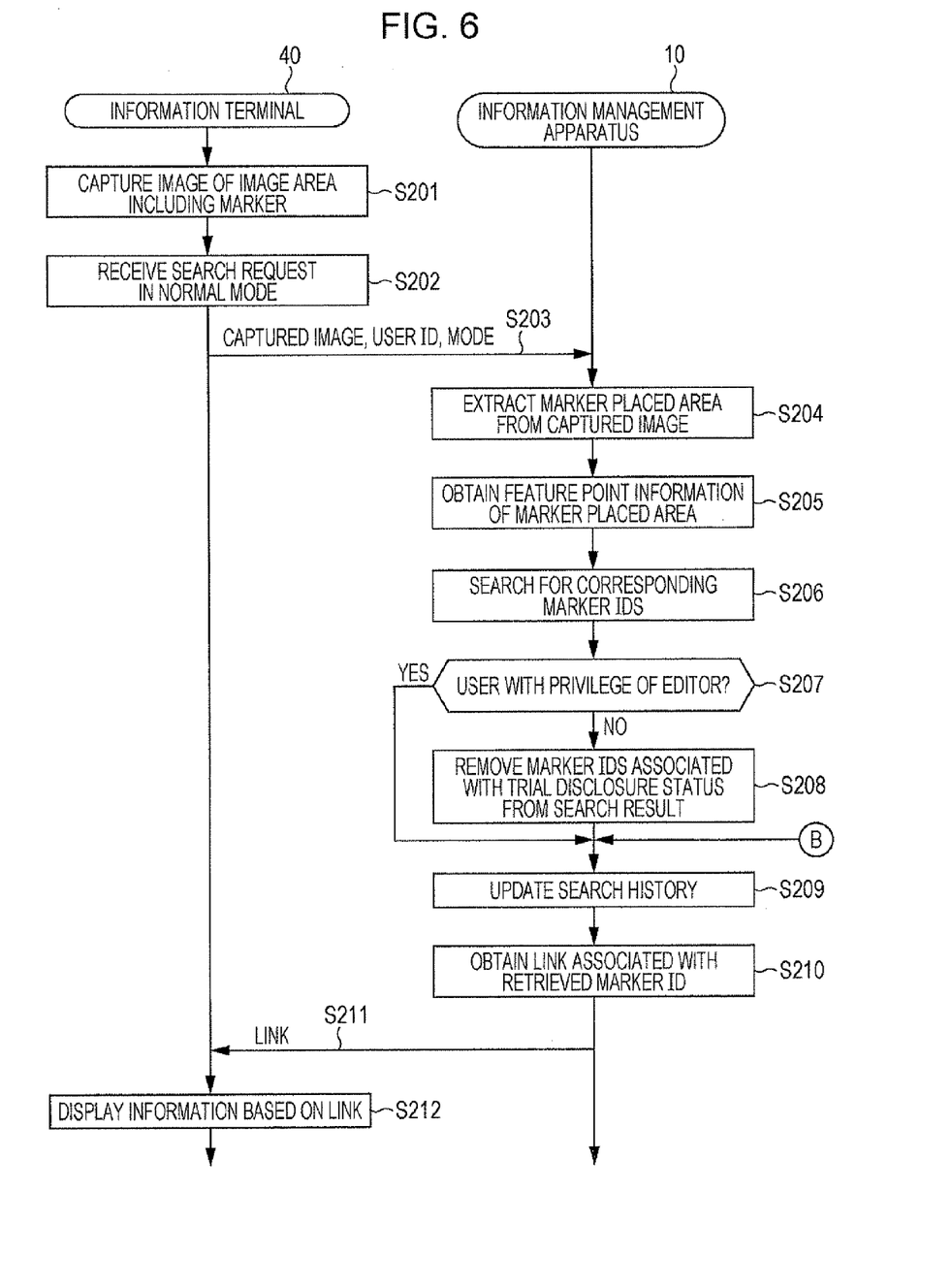
FIG. 6 is a sequence diagram illustrating an example of an information providing process.

As illustrated in FIG. 6, the information terminal 40 captures an image of an image area that contains a marker formed on a printed material, on the basis of operation information received from the user (S201). Upon receipt of a search request in the normal mode from the user (S202), the information terminal 40 transmits the captured image, the user ID, the mode of the search request (normal mode) to the information management apparatus 10 (S203).

The information management apparatus 10 detects a marker from the captured image received from the information terminal 40, and extracts a marker placed area in which the detected marker is placed (S204). For example, the information management apparatus 10 may extract a circumscribed rectangle of the marker as the marker placed area. Then, the information management apparatus 10 obtains feature point information that is based on image features of the extracted marker placed area (S205), and searches the marker information management table for corresponding marker IDs using the obtained feature point information as a search key (S206). For example, the information management apparatus 10 may calculate similarity scores between the feature point information serving as the search key and pieces of feature point information stored in the marker information management table, and may obtain a predetermined number of marker IDs in descending order of the calculated similarity scores as the search result.

If the user identified by the user ID received in S203 does not have the privilege of the editor (NO in S207), the information management apparatus 10 removes, from the search result, a marker ID associated with the trial disclosure status among the marker IDs retrieved in S206 (S208). Note that the information management apparatus 10 may determine in S207 whether or not the user identified by the user ID has the privilege of the editor by referring to the user's role associated with the user ID in the user information management table.

If the user identified by the user ID received in S203 has the privilege of the editor (YES in S207) or after S208, the information management apparatus 10 updates search histories of the marker IDs obtained as the search result (S209). For example, in the case of YES in S207 or after S208, the information management apparatus 10 may add one to the number of times retrieved (or the number of times information has been provided) associated with each of the marker IDs obtained as the search result in the marker information management table illustrated in FIG. 4. Note that the information management apparatus 10 does not add one to the number of times retrieved (or the number of times information has been provided) for the marker ID removed from the search result in S208.

Subsequently, the information management apparatus 10 obtains links associated with the marker IDs obtained as the search result by referring to the marker information management table (S210), and transmits the obtained links to the information terminal 40 (S211).

The information terminal 40 selects at least one link from among the links received from the information management apparatus 10, accesses the selected link to obtain information, and displays the obtained information (S212).

The above is an example of the information providing process performed in the information processing system 1 according to the exemplary embodiment. It should be noted that the information providing process is not limited to the above-described sequence. For example, the information management apparatus 10 may remove, from the search result, a marker ID associated with the registrant user ID that is different from the requestor user ID, among the marker IDs that have been retrieved in S206 and are associated with the trial disclosure status. Alternatively, the information management apparatus 10 may remove, from the search result, a marker ID for which the registrant user ID and the requestor user ID are not associated with the same group ID, among the marker IDs that have been retrieved in S206 and are associated with the trial disclosure status. The above-described process permits the user having the privilege of the editor, such as the user who has registered a marker, to conduct a test (examination) regarding the marker in an actual operation environment before the marker is disclosed to general users.

3-3. Marker Status Updating Process

Next, a marker status updating process will be described. The following sequentially describes two examples: the case of updating the status of a marker in response to an instruction of an editor, and the case of updating the status of a marker in accordance with a search history of the marker.

3-3-1. First Marker Status Updating Process

Referring to a sequence diagram illustrated in FIG. 7, a first marker status updating process that is performed in response to an instruction of an editor will be described first.

Figure 7:
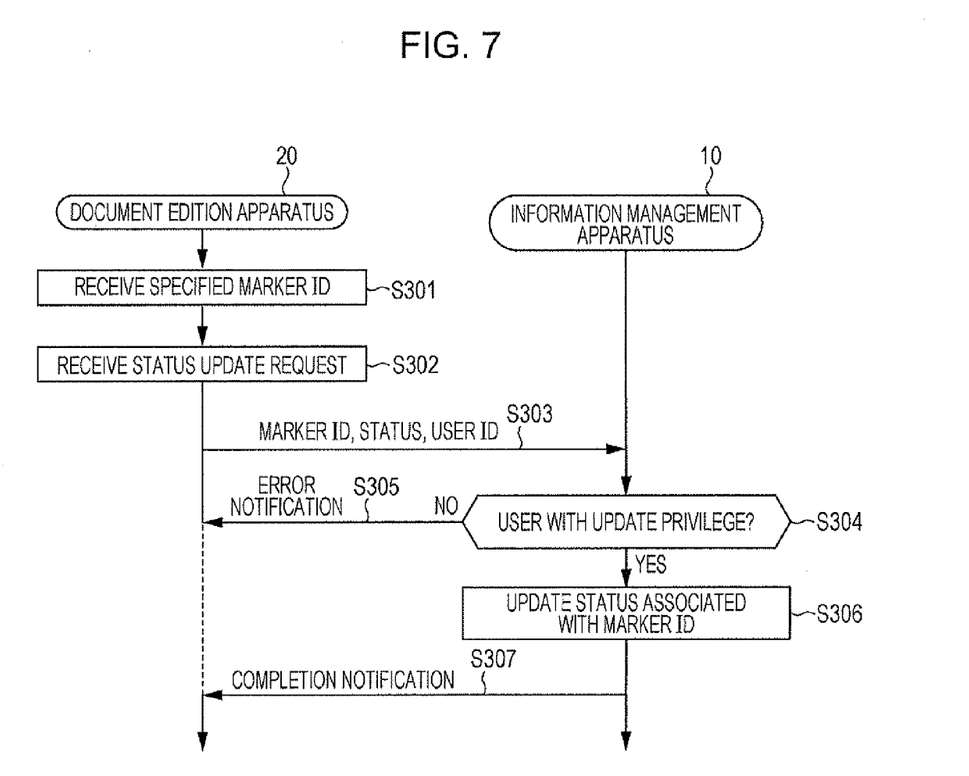
FIG. 7 is a sequence diagram illustrating an example of a marker status updating process.

As illustrated in FIG. 7, the document edition apparatus 20 receives from the editor a marker ID specifying a marker whose status is to be updated (S301). Upon receipt of a status update request which contains a specified status (disclosure/trial disclosure) to which the status is to be updated (S302), the document edition apparatus 20 transmits the marker ID, the status, and the user ID to the information management apparatus 10 (S303).

If the user identified by the user ID received from the document edition apparatus 20 does not have a privilege to update the status associated with the marker ID related to the request (NO in S304), the information management apparatus 10 notifies the document edition apparatus 20 of an error (S305) and terminates the process. For example, the information management apparatus 10 may determine whether or not the user identified by the user ID has the privilege to update the status associated with the marker ID by determining whether or not the user's role associated with the user ID is the editor.

If the user identified by the user ID received from the document edition apparatus 20 has the privilege to update the status associated with the marker ID related to the request (YES in S304), the information management apparatus 10 updates the status associated with the marker ID in the marker information management table to the status (disclosure/trial disclosure) received in S303 (S306). The information management apparatus 10 then notifies the document edition apparatus 20 of completion of updating (S307), and terminates the process.

It should be noted that the first marker status updating process is not limited to the above-described sequence. For example, when the user ID received from the document edition apparatus 20 specifies the registrant of the marker ID related to the request, the information management apparatus 10 may determine that the user identified by the user ID has the privilege to update the status associated with the marker ID; otherwise, the information management apparatus 10 may determine that the user identified by the user ID does not have the privilege to update the status associated with the marker ID. Alternatively, for example, when the user ID received from the document edition apparatus 20 specifies the editor and is associated with the same group ID as that of the registrant of the marker ID related to the request, the information management apparatus 10 may determine that the user identified by the user ID has the privilege to update the status associated with the marker ID; otherwise, the information management apparatus 10 may determine that the user identified by the user ID does not have the privilege to update the status associated with the marker ID.

The above-described first marker status updating process permits the editor to limit a target to which information associated with the marker ID is to be disclosed, at a timing desired by the editor.

3-3-2. Second Marker Status Updating Process

Referring to a flowchart illustrated in FIG. 8, a second marker status updating process performed by the information management apparatus 10 on the basis of a search history of each marker will be described next.

Figure 8:
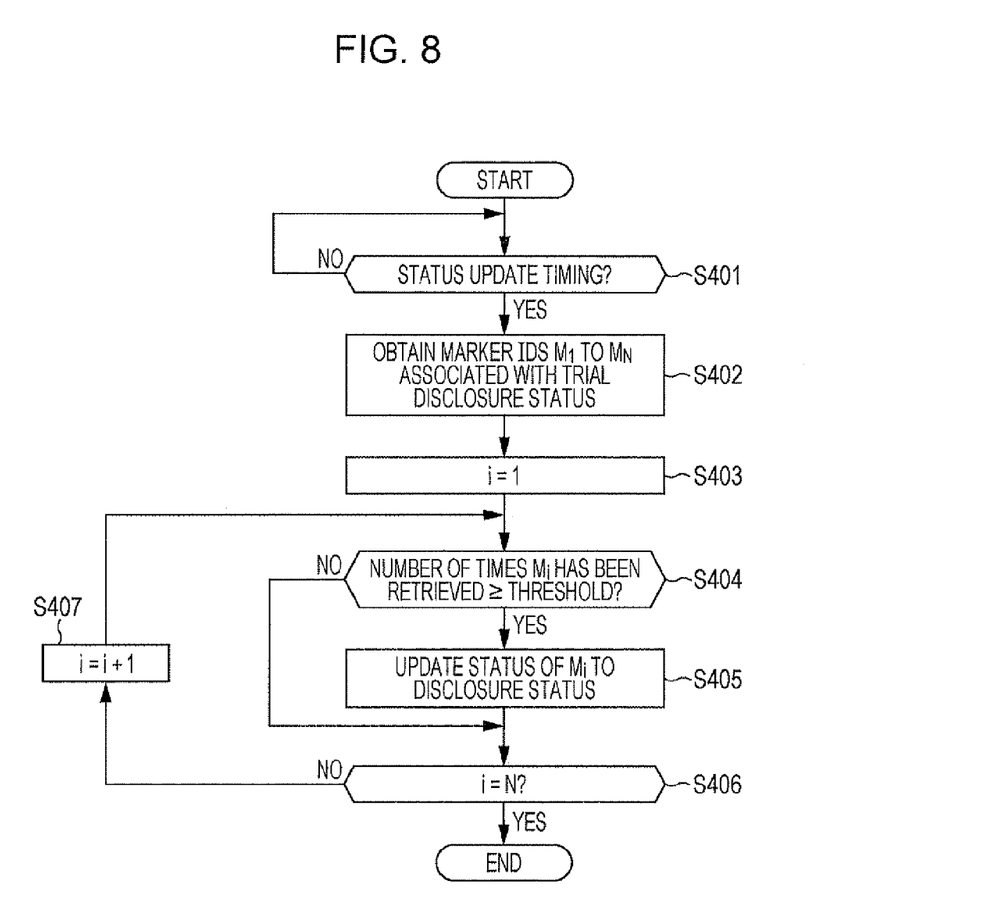
FIG. 8 is a flowchart illustrating another example of the marker status updating process.

As illustrated in FIG. 8, if a timing for updating the status of a marker has not come yet (NO in S401), the information management apparatus 10 waits for the timing. If the timing for updating the status of the marker has come (YES in S401), the information management apparatus 10 extracts and obtains marker IDs ($M_1$ to $M_N$) associated with the trial disclosure status from the marker information management table (S402).

The information management apparatus 10 then initializes an index i to one (S403). If the information management apparatus 10 determines that the number of times the marker ID $M_i$ has been retrieved is greater than or equal to a threshold (YES in S404) by referring to the marker information management table, the information management apparatus 10 updates the status associated with the marker ID $M_i$ to the disclosure status (S405).

If the number of times the marker ID $M_i$ has been retrieved is less than the threshold (NO in S404) or after S405, the information management apparatus 10 increments the index i by one (adds one to the index i) (S407) when the index i has not reached the value N (NO in S406). The process then returns to S404. If the index i has reached the value N in S406 (YES in S406), the information management apparatus 10 terminates the process.

In the above-described second marker status updating process, the status associated with the marker ID is automatically updated from the trial disclosure status to the disclosure status when the number of times the marker ID has been retrieved becomes greater than or equal to the threshold. Therefore, updating of the status to the disclosure status is no longer forgotten.

Note that one of the above-described first and second marker status updating processes may be employed or both may be employed.

4. Modifications

It should be noted that the present invention is not limited to the exemplary embodiment above. For example, as described below, the work load of the editor for performing trial search of a marker ID may be reduced.

4-1. Information Providing Process (First Test Mode)

Referring first to a sequence diagram illustrated in FIG. 9, details of an information providing process that is performed when the information terminal 40 requests the information management apparatus 10 to provide information based on a marker formed on a printed material in a test mode will be described.

Figure 9:
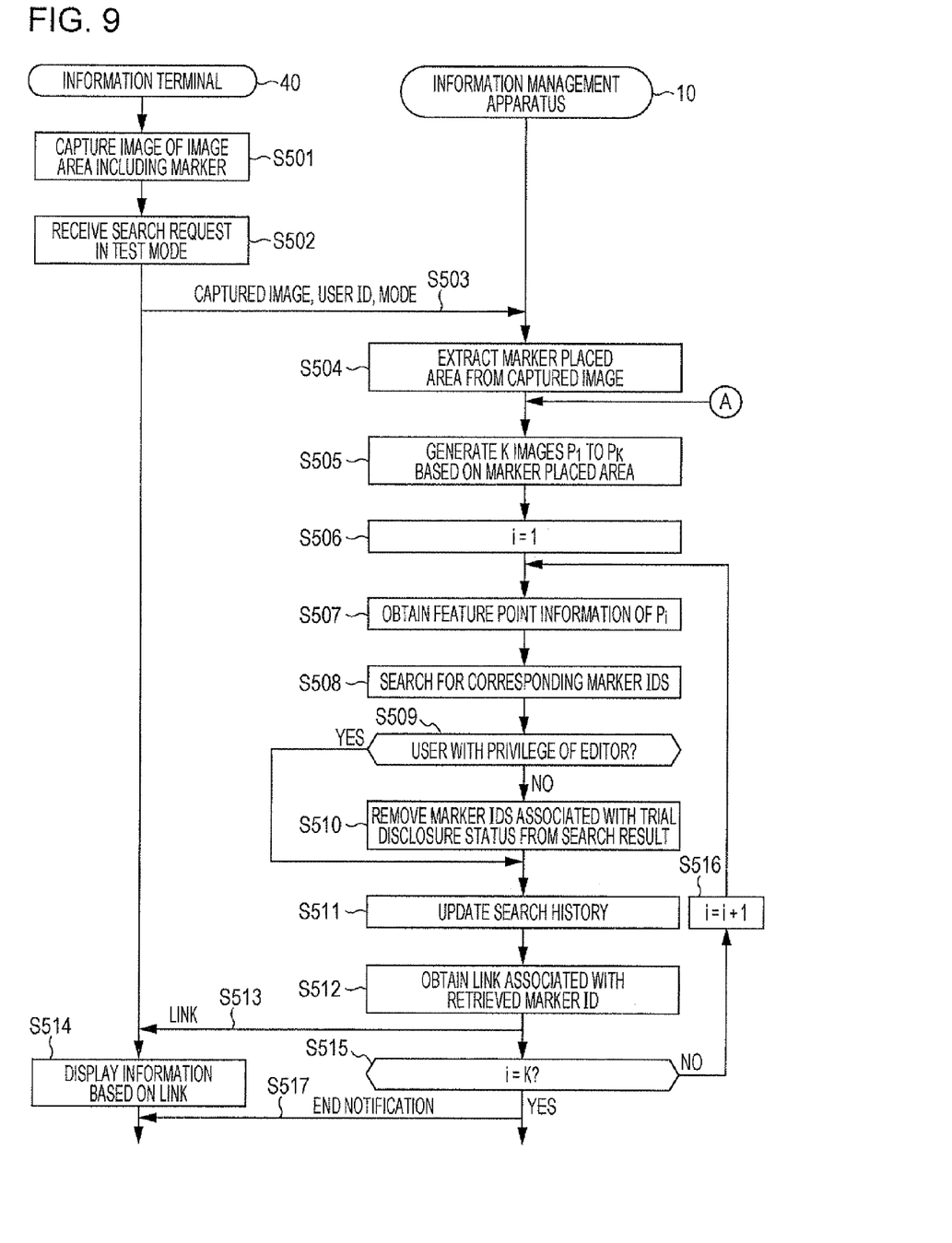
FIG. 9 is a sequence diagram illustrating another example of the information providing process.

As illustrated in FIG. 9, the information terminal 40 captures an image of an image area that contains a marker formed on a printed material, on the basis of operation information received from the user (S501). Upon receipt of a search request in the test mode from the user (S502), the information terminal 40 transmits the captured image, the user ID, and the mode of the search request (test mode) to the information management apparatus 10 (S503).

The information management apparatus 10 detects a marker from the captured image received from the information terminal 40, and extracts a marker placed area in which the detected marker is placed (S504). For example, the information management apparatus 10 may extract a circumscribed rectangle of the marker as the marker placed area.

The information management apparatus 10 generates K images $P_1$ to $P_K$ based on image information of the marker placed area (S505). The images $P_1$ to $P_K$ may include an image of the marker placed area extracted in S504 and images obtained by performing image processing, such as projective transformation, rotation, brightness conversion, blurring, size conversion, clipping, and noise addition, on the image of the marker placed area.

Subsequently, the information management apparatus 10 initializes an index i to one (S506). Then, the information management apparatus 10 obtains feature point information that is based on image features of the image $P_i$ (S507), and searches the marker information management table for corresponding marker IDs using the obtained feature point information as a search key (S508). For example, the information management apparatus 10 may calculate similarity scores between the feature point information serving as the search key and pieces of feature point information stored in the marker information management table, and may obtain a predetermined number of marker IDs in descending order of the calculated similarity scores as the search result.

If the user identified by the user ID received in S503 does not have the privilege of the editor (NO in S509), the information management apparatus 10 removes, from the search result, a marker ID associated with the trial disclosure status among the marker IDs retrieved in S508 (S510). Note that the information management apparatus 10 may determine in S509 whether or not the user identified by the user ID has the privilege of the editor by referring to the user's role associated with the user ID in the user information management table.

If the user identified by the user ID received in S503 has the privilege of the editor (YES in S509) or after S510, the information management apparatus 10 updates search histories of the marker IDs obtained as the search result (S511). For example, the information management apparatus 10 may add one to the number of times retrieved (or the number of times information has been provided) associated with each of the marker IDs obtained as the search result in the case of YES in S509 or after S510 in the marker information management table illustrated in FIG. 4. Note that the information management apparatus 10 does not add one to the number of times retrieved (or the number of times information has been provided) for the marker ID removed from the search result in S510.

Subsequently, the information management apparatus 10 obtains links associated with the corresponding marker IDs obtained as the search result by referring to the marker information management table (S512), and transmits the obtained links to the information terminal 40 (S513).

The information terminal 40 selects at least one link from among the links received from the information management apparatus 10, accesses the selected link to obtain information, and displays the obtained information (S514).

If the index i has not reached the value K (NO in S515), the information management apparatus 10 increments the index by one (adds one to the index i) (S516). The process then returns to S507. If the index i has reached the value K (YES in S515), the information management apparatus 10 notifies the information terminal 40 of end of the process (S517), and terminates the process.

In the sequence above, test images are generated. This saves the editor capturing an image, and thus reduces the load for performing trial search.

4-2. Information Providing Process (Second Test Mode)

Referring next to a sequence diagram illustrated in FIG. 10, details of a process of appropriately selecting the test mode in the case where the test mode is not specified will be described.

Figure 10:
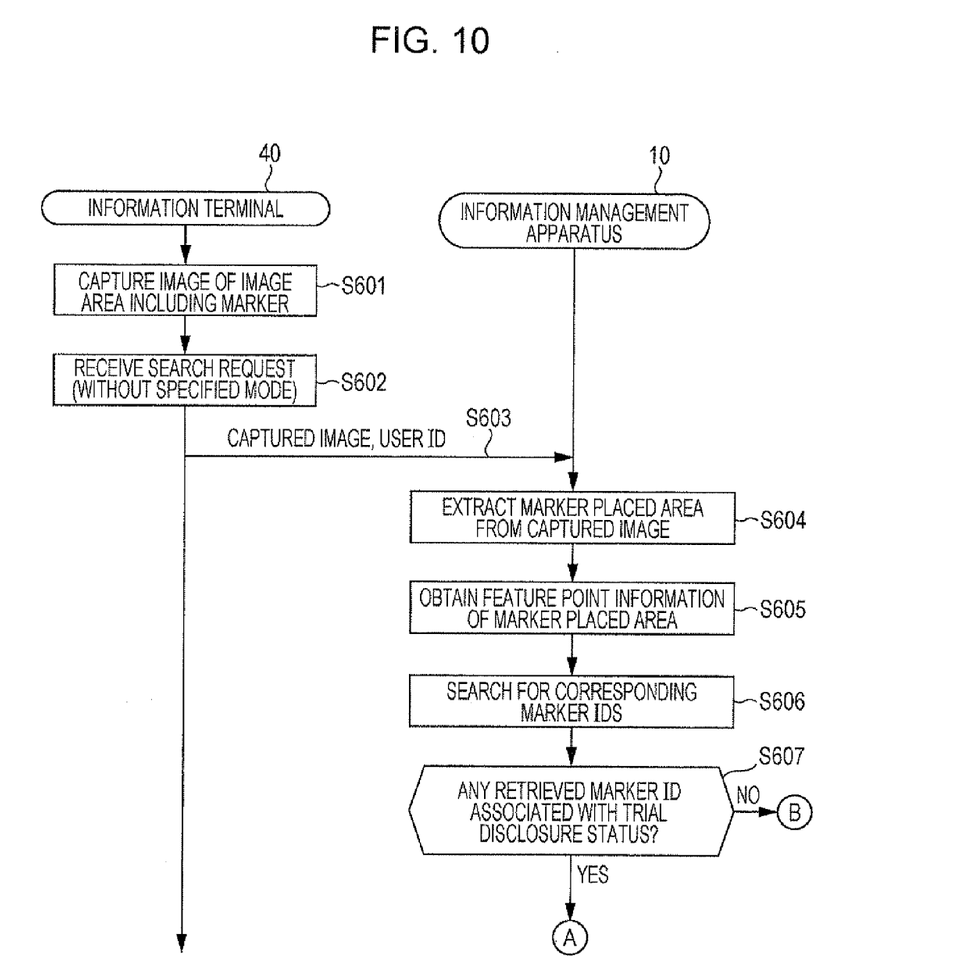
FIG. 10 is a sequence diagram illustrating still another example of the information providing process.

As illustrated in FIG. 10, the information terminal 40 captures an image of an image area that contains a marker formed on a printed material, on the basis of operation information received from the user (S601). Upon receipt of a search request without any specified mode from the user (S602), the information terminal 40 transmits the captured image and the user ID to the information management apparatus 10 (S603).

The information management apparatus 10 detects a marker from the captured image received from the information terminal 40, and extracts a marker placed area in which the detected marker is placed (S604). For example, the information management apparatus 10 may extract a circumscribed rectangle of the marker as the marker placed area. Then, the information management apparatus 10 obtains feature point information based on image features of the extracted marker placed area (S605), and searches the marker information management table for corresponding marker IDs using the obtained feature point information as a search key (S606). For example, the information management apparatus 10 may calculate similarity scores between the feature point information serving as the search key and pieces of feature point information stored in the marker information management table, and may obtain a predetermined number of marker IDs in descending order of the calculated similarity scores as the search result.

If the retrieved marker IDs include a marker ID associated with the trial disclosure status (YES in S607), the process proceeds to S505 of FIG. 9. On the other hand, if the retrieved marker IDs include no marker ID associated with the trial disclosure status (NO in S607), the process proceeds to S209 of FIG. 6.

In the sequence above, test images are generated if trial search is possibly conducted for the marker ID associated with the trial disclosure status. This saves the editor capturing an image, and thus reduces the load for performing trial search.

In the exemplary embodiment described above, the information management apparatus 10 may obtain the user ID and the password upon receipt of a request from the document edition apparatus 20 or the information terminal 40, and may perform the information registration process or the information providing process only when the set of the user ID and the password matches one of the sets stored in the user information management table.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information providing apparatus comprising:
    a storing unit that stores, for each piece of marker image identification information identifying a corresponding marker image placed on a corresponding image, an image feature included in an area where the corresponding marker image is placed, related information associated with the piece of marker image identification information, and disclosure limitation information indicating whether the related information is to be disclosed to all users or specific users, in an image information memory in association with one another;
    a user information memory that stores user identification information identifying a corresponding user and privilege information indicating a privilege assigned to the user, in association with each other; and
    a processing unit configured to control:
        an obtaining unit that obtains, from an information terminal, user identification information and a target image;
        a search unit that searches the image information memory for one or more pieces of marker image identification information of one or more marker images having an image feature similar to an image feature included in the target image;
        a providing unit that provides, in a case where the disclosure limitation information associated with a piece of marker image identification information among the one or more retrieved pieces of marker image identification information indicates that the corresponding related information is to be disclosed to specific users and the privilege information associated with the obtained user identification information indicates that access to the related information that is to be disclosed to specific users is permitted, the corresponding related information to the information terminal;
        a recording unit that records, for each piece of marker image identification information of a corresponding marker image, the number of times the related information associated with the piece of marker image identification information has been provided by the providing unit; and
        a first updating unit that updates, in a case where the number of times the related information associated with a piece of marker image identification information among the pieces of marker image identification information of the marker images has been provided is greater than or equal to a threshold, the disclosure limitation information associated with the piece of marker image identification information to indicate that the corresponding related information is to be disclosed to all users.

2. The information providing apparatus according to claim 1, wherein in a case where the disclosure limitation information associated with a piece of marker image identification information among the one or more retrieved pieces of marker image identification information indicates that the corresponding related information is to be disclosed to all users, the providing unit provides the corresponding related information to the information terminal without regard to the privilege information associated with the obtained user identification information.

3. The information providing apparatus according to claim 1, wherein the processing unit is further configured to control:
    a second updating unit that updates, on the basis of the marker image identification information of a marker image and specified information, the disclosure limitation information associated with the marker image identification information.

4. The information providing apparatus according to claim 1, wherein the processing unit is further configured to control:
    a generating unit that generates a plurality of test images on the basis of an image of an area of the target image where a marker image is placed,
    wherein the search unit searches, for each of the plurality of test images, the image information memory for one or more pieces of marker image identification information of one or more marker images having an image feature similar to an image feature included in the test image.

5. A non-transitory computer readable medium storing a program causing a computer to execute a process, the process comprising:
    storing, for each piece of marker image identification information identifying a corresponding marker image placed on a corresponding image, an image feature included in an area where the corresponding marker image is placed, related information associated with the piece of marker image identification information, and disclosure limitation information indicating whether the related information is to be disclosed to all users or specific users, in an image information memory in association with one another;
    storing user identification information identifying a corresponding user and privilege information indicating a privilege assigned to the user, in a user information memory in association with each other;
    obtaining, from an information terminal, user identification information and a target image;
    searching the image information memory for one or more pieces of marker image identification information of one or more marker images having an image feature similar to an image feature included in the target image;
    providing, in a case where the disclosure limitation information associated with a piece of marker image identification information among the one or more retrieved pieces of marker image identification information indicates that the corresponding related information is to be disclosed to specific users and the privilege information associated with the obtained user identification information indicates that access to the related information that is to be disclosed to specific users is permitted, the corresponding related information to the information terminal;
    recording, for each piece of marker image identification information of a corresponding marker image, the number of times the related information associated with the piece of marker image identification information has been provided; and
    updating, in a case where the number of times the related information associated with a piece of marker image identification information among the pieces of marker image identification information of the marker images has been provided is greater than or equal to a threshold, the disclosure limitation information associated with the piece of marker image identification information to indicate that the corresponding related information is to be disclosed to all users.

* * * * *